Patented Aug. 23, 1932

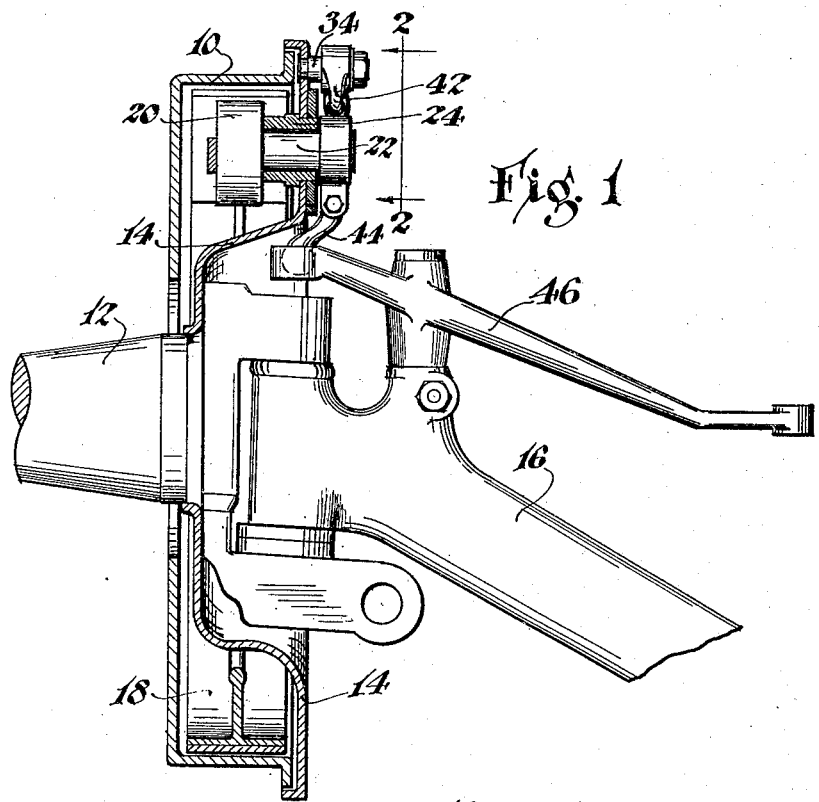
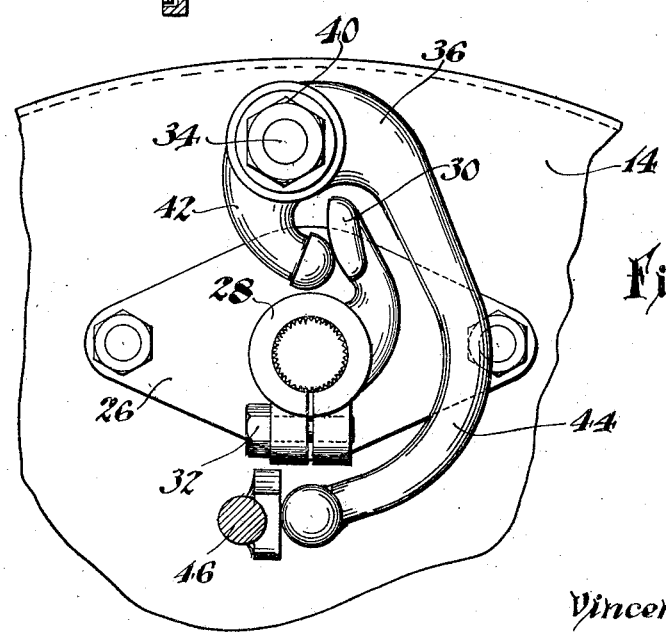

1,873,103

UNITED STATES PATENT OFFICE

VINCENT BENDIX, OF SOUTH BEND, INDIANA, ASSIGNOR TO BENDIX BRAKE COMPANY, OF SOUTH BEND, INDIANA, A CORPORATION OF ILLINOIS

BRAKE

Original application filed April 27, 1925, Serial No. 26,036. Divided and this application filed June 26, 1930. Serial No. 463,910.

This invention relates to brakes and more particularly to operating mechanisms for swiveled wheel brakes. The present application is a division of my co-pending application, Serial No. 26,036 filed April 27th, 1925.

One object of the invention is to provide a brake operating means in which the detail parts are of simple form.

Another object of the invention is to provide an arrangement of means for increasing the leverage ratio of the brake operating levers.

Other objects relating to novel features of construction will appear from the following description of one embodiment of the invention shown in the accompanying drawing, in which:

Figure 1 is an elevational view partly in section showing my improved brake operating means installed on a portion of a vehicle wheel, and Figure 2 is an enlarged view of the operating mechanism taken in the direction of lines 2—2 of Figure 1.

The brake selected for illustration includes a drum 10, which is secured to a wheel (not shown) that revolves upon the spindle 12. The open side of the drum 10 is closed by a backing or supporting plate 14 secured to the steering knuckle that is pivotally mounted on one end of the axle 16 to swivel about a vertical axis. Within the drum are brake shoes 18 which are expanded into contact with the drum by a cam 20. A rock shaft 22 having a serrated end is secured to the cam and projects outwardly through the backing plate 14 in which it is supported by a bearing 24 secured to the plate by a bracket 26. On the outer serrated end of shaft 22 is clamped a collar 28 having an upwardly projecting arm 30. The collar 28 has serrations corresponding to those of the shaft formed on its interior and after it has been arranged in its desired position with respect to the shaft 22, it is locked in place by the clamping screw 32.

Immediately above the shaft 22 is a second shaft 34 secured in any desired manner to the backing plate 14 and upon which is pivotally mounted a double arm lever 36. Lever 36 is secured upon the shaft 34 by a nut 40 to prevent its endwise displacement, but care should be taken that the arm 36 is not clamped against the support.

One arm 42 of the double arm lever projects downwardly and has a spherical end that contacts with the face of the upwardly projecting lever 30. The other arm 44 extends outwardly and downwardly to a position beneath the rock shaft 22 and is also provided with a spherical end portion adapted to contact with the horizontal swinging lever 46. The contacting end of lever 46 is preferably formed with a flat surface and the opposite end is adapted to be connected with the brake operating rods (not shown).

In the operation of the brake, when motion is imparted to lever 46, the flatted end contacts with the ball end of lever 44 and rotates it in a counterclockwise direction. The arm 42 will also be moved and bear against the arm 30 in a manner to turn the cam 20 to expand the brake shoes 18.

In the present embodiment, lever 30 is shown with a curved face that will cause levers 30 and 36 to rotate at substantially the same angular speed, but it is apparent that other shapes may be used.

While I have illustrated and described one embodiment of the invention, it is understood that this showing and description are illustrative only and that I do not intend that the scope of the invention shall be limited to this particular construction or otherwise, except insofar as I have included such limitations within the terms of the following claim.

Having thus described the features of the invention, what I claim as new and desire to secure by Letters Patent is:

A brake operating lever formed with a bearing, two projecting arms on the same side of the bearing, one of said arms having a greater length than the other, and the ends of said arms being arranged in a line substantially radial of the bearing.

In testimony whereof, I have hereunto signed my name.

VINCENT BENDIX.